United States Patent Office 3,000,696
Patented Sept. 19, 1961

3,000,696
PROCESS FOR RECOVERY OF URANIUM FROM FOSSIL FUELS
Charles F. Teichmann, Crestwood, N.Y., assignor to Texaco Development Corporation, New York, N.Y., a corporation of Delaware
No Drawing. Filed July 27, 1956, Ser. No. 600,392
12 Claims. (Cl. 23—14.5)

This invention relates to the recovery of uranium from carbonaceous minerals containing uranium.

Various uraniferous fossil carbonaceous fuel deposits are known, notable among which are those occurring in the Black Hills section of the Dakotas and Montana where ore grade uraniferous lignite exists in commercial quantities. The U.S. Atomic Energy Commission has defined commercial quality uranium ore as a material with a minimum uranium content of $\frac{1}{10}$ of 1 percent $U_3O_8$. Uranium concentrations in lignite deposits are known in which the concentration of uranium is several times the minimum set by AEC. Some coal deposits, particularly in the western part of the United States, contain commercial quantities of uranium. These coals generally are low grade bituminous coals. Certain oil shales are also known to contain commercial quantities of uranium. Some of the oil shales in Sweden, for example, are reported to contain on the order of 0.5 percent uranium.

The process of this invention is directed to an improved method for the concentration of uranium in carbonaceous fossil fuel ores and the recovery of uranium from the concentrated ore.

The process of this invention is applicable to the recovery of uranium from various carbonaceous materials, for example, coal, lignite and oil shale, which contain a sufficient fuel value to support combustion. In accordance with this invention, the carbonaceous material is reacted with a limited amount of free oxygen at a temperature above about 2000° F. in proportions effective for the conversion of at least the major portion of the carbon content of the material to carbon monoxide. Hydrogen is usually present in the fuel, and moisture or steam is naturally present or may be added thereto. As a result, hydrogen is also produced with the carbon monoxide.

The reaction of the carbonaceous content of the fuel with a controlled amount of oxygen results in concentration of uranium in the solid residue. At the same time, the residue is rendered more susceptible to treatment with an aqueous leaching solution, for example, a solution of a strong mineral acid, suitably sulfuric acid or nitric acid, or with an alkali metal carbonate, for example, potassium or sodium carbonate, preferably with the bicarbonates.

In a preferred embodiment of this invention, a carbonaceous material containing uranium is subjected to reaction, while in disperse phase or suspension, with oxygen in an unpacked, compact reaction zone at a temperature within the range of 2000° to 3200° F. Air, oxygen-enriched air, or substantially pure oxygen may be used; substantially pure oxygen is preferred. The ash or solid residue from the reaction zone is contacted with water effecting solution of water-soluble components of the ash without substantial solution of uranium. The residue, further enriched in uranium, is then pulped with a leach solution under oxidizing conditions effecting solution of uranium compounds. The leaching is effected by means of an aqueous solution of a reagent, preferably a strong mineral acid or alkali metal carbonate. With an alkali metal carbonate, the leaching solution preferably contains a strong chemical oxidizing agent, for example, manganese dioxide or potassium permanganate, effecting conversion of the uranium to the hexavalent state. Free oxygen, preferably substantially pure oxygen, may be employed, alone or together with the chemical oxidizing agent, to enhance the solubility of uranium in the leaching solution.

The reducing atmosphere which exists in the reactor apparently reduces or partially reduces the uranium oxide contained in the ore to one of the water-insoluble oxides. The ash or residue when contacted with water is partially dissolved, which effects a further concentration of the uranium in the insoluble portion of the residue. The uranium may be extracted from the insoluble portion of the residue by one of the known procedures for uranium extraction.

In a preferred embodiment, the insoluble portion of the residue containing uranium is separated from the solution of soluble constituents and is contacted with aqueous solution of sulfuric acid. The leach liquor is passed over ion exchange resin for recovery of the uranium sulfate. The resin is eluted with hydrochloric acid (or an equivalent eluant) and the resulting solution treated to precipitate the uranium from the solution. Ammonia and powdered magnesium oxide are suitable precipitants.

Alternatively, the residue is contacted with a solution of sodium carbonate containing sodium bicarbonate, preferably in the presence of an oxidizing agent such as manganese dioxide or potassium permanganate. Leaching with sodium carbonate is preferably carried out under pressure and at a temperature in the range of 200° to 400° F., preferably in the range of 225° to 300° F. and at a pressure in the range of 50 to 600 p.s.i.g. Alternatively, although less desirably, the carbonate extraction may be carried out at substantially atmospheric pressure or near atmospheric pressure and at a temperature within the range of from about 70° F. to about 225° F. At atmospheric pressure, the upper temperature is limited by the boiling point of the solution; usually an upper temperature limit of 185 to 200° F. is imposed by practical operating considerations. The presence of the bicarbonate in the leaching solution increases the rate of extraction and the extent of solubility of uranium oxide. The oxidizing agent, for example, manganese dioxide, ensures conversion of the uranium to the soluble hexavalent state.

The uranium-pregnant solution is separated from the insoluble portion of the residue. The uranium salt may be precipitated from the solution by a suitable reagent. Alternatively, the uranium salt may be recovered by ion exchange.

In carrying out the reaction of the carbonaceous uranium-bearing ore with an oxygen-containing gas, the temperature within the reaction zone is maintained autogenously at a temperature above 1800° F. and preferably within the range of 2200° to 3200° F. Carbonaceous materials of high heating value or high carbon content, i.e. fuel grade ore, may require, in addition to oxygen or air, an endothermic reactant, such as steam or carbon dioxide, to control the temperature. Steam is generally preferable if an endothermic reactant is required. The amount of steam required to maintain the temperature within the desired range depends upon the particular fuel supplied to the reaction zone and the concentration of oxygen in the oxygen-containing gas stream. With some of the lower grade carbonaceous minerals, it may be necessary to add supplemental amounts of fuel. In such cases, it is preferable to employ as an auxiliary fuel a hydrocarbon gas or oil although high carbon, low ash content solid fuels may also be used, for example, petroleum coke.

The streams of reactants supplied to the reaction zone preferably are preheated. In general, substantially pure oxygen may be preheated to a temperature up to about 600° F. whereas air may be preheated without difficulty to a considerably higher temperature, for example, to a temperature as high as 1200° F. by indirect heat exchange, and to temperatures on the order of 2000° F. by direct heat exchange, e.g., by means of ceramic pebbles. Generally no preheat is required when substantially pure oxygen is employed, and satisfactory results may often be obtained without preheat of the air, although preheat increases gasification efficiency and permits operation with lesser amounts of fuel than required without preheat. The steam, mineral and auxiliary fuel, if present, are also preferably preheated, preferably to a temperature within the range of, for example, 600° to 1200° F. The temperatures mentioned as preheat temperatures are illustrative only and are not to be construed as limiting temperatures.

The particle size of the mineral supplied to the reaction zone should be finer than 100 mesh and preferably at least 95 percent through 200 mesh (U.S. Standard screen scale). Pulverization of the mineral may be effected by any of the conventional grinding methods. A preferred method of pulverizing the mineral is by fluid energy pulverization, for example as described in U.S. 2,735,787, issued to Du Bois Eastman and Leon P. Gaucher on Process for Pulverizing Solid Materials, dated February 21, 1956. According to the preferred method of pulverizing, the mineral in moderately pulverized form, i.e., particles smaller than about ¼″ average diameter, are mixed with a vaporizable liquid, suitably water, and passed through an elongated tubular heating zone wherein the liquid is vaporized forming a dispersion of solid particles in vapor. The dispersion is subjected to a high degree of turbulence suitably by impingement of two streams upon one another at velocities above about 60 feet per second and preferably above 300 feet per second effecting disintegration of the particles to powder. Although water is generally the preferred vaporizable liquid, in some instances, for example, in which the mineral is deficient in fuel value, hydrocarbon liquid may be employed as the sole medium or as a supplement with water. The dispersion of solid particles in vapor may be subjected to a separation step to remove any desired part of the vapor from the solid particles or the entire dispersion may be fed directly into the reaction zone.

Solid particles dispersed in vapor are introduced into the reaction zone wherein they are intimately admixed with oxygen, preferably relatively pure oxygen. The reaction zone is maintained at a pressure within the range of atmospheric pressure to 1000 p.s.i.g., preferably 100 to 600 p.s.i.g. The resulting gaseous products of partial oxidation and residual solids are cooled substantially instantaneously to a temperature below 1000° F., preferably below 500° F., by direct contact with liquid water.

The product gas is separated from the solid residue and may be employed as a source of hydrogen or as a source of synthesis feed gas, for example, for synthesis of hydrocarbons, methanol or ammonia. Preferably, the quantity of water employed in the quench cooling of the gas and residual solid is in excess of the amount vaporized in reducing the temperature from that of the reaction zone to the desired quench temperature. Water effectively removes solid particles from the gas stream. Conventional gas-liquid contact apparatus, or scrubbers, may be employed to ensure complete removal of solid particles from the gas stream. When the residue is in molten form, the reaction zone is preferably arranged to permit the molten residue to drop directly into a pool of quench water. A suitable arrangement of apparatus of this type is shown in the patent to Strasser, 2,701,755, and in the copending application of Du Bois Eastman, Serial No. 525,240, filed July 29, 1955, now U.S. Patent 2,871,114.

The solid residue may be leached with water, e.g., the quench water, prior to acid or carbonate leaching, mentioned above, or the solubilizing reagent may be added directly to the quench water. In a preferred embodiment, the quench water is separated from the residual solid, following which residual solid is treated with a reagent capable of forming a soluble salt of uranium, i.e., a strong mineral acid or an alkali metal carbonate.

Various known recovery methods may be employed to recover the dissolved uranium salt from the solution. One of the most practical methods is the separation of the uranium from the solution by means of an ion exchange resin. The solids are first separated from the solution and the solution then passed over a bed of the ion exchange resin. The resin-in-pulp technique of extraction has recently been developed and may be used with some residues. The resin-in-pulp technique involves contacting the pulp, following separation of the solids which may be settled out, with an ion exchange resin in suitable form, for example, in the form of small beads contained in baskets. The ion exchange resin is then eluted with a suitable eluting agent, for example, dilute hydrochloric acid (or its equivalent, e.g. sodium chloride and sulfuric acid), a solution of hydrochloric acid and ammonium acid), a solution of hydrochloric acid and ammonium chloride, sulfuric acid and ammonium nitrate, ammonium nitrate and nitric acid. Instead of ion exchange, other methods of concentrating the uranium may be used, for example, solvent extraction; a typical solvent is a solution of dodecyl phosphate in kerosene. The kerosene solution extracts uranium from the uranium pregnant liquor at ordinary (atmospheric) temperature and pressure. The kerosene solution and uranium pregnant liquor are intimately contacted, separated from one another and the uranium dissolved from the extract by contacting the uranium-rich kerosene solution with an aqueous solution of hydrochloric acid. The uranium may be precipitated from the hydrochloric acid by boiling, at the same time effecting recovery of the hydrochloric acid. In some cases, the uranium-pregnant solution may be separated from the extracted residue and the uranium precipitated directly from the solution. This procedure is generally economical only with relatively strong solutions obtainable from feed material rich in uranium.

Precipitation of uranium from the uranium-pregnant solution, either with or without concentration by ion exchange, may be effected by various means. Ammonia precipitation is generally most economical. Most of the ammonia may be subsequently recovered. Other precipitants may be used, notably powdered magnesium oxide.

In one specific application of the process of this invention to the recovery of uranium from lignite, a Dakota lignite containing uranium is processed. The lignite has a proximate analysis of about 30 percent moisture, 29 percent volatile matter, 29 percent fixed carbon and 12 percent ash. The lignite is ground and mixed with water to form a slurry in relative proportions of 530 pounds of lignite (dry basis) in 760 pounds of water. The slurry is passed through a heating coil wherein the water is vaporized forming a dispersion of powdered lignite in steam. Steam is separated from the dispersion in a cyclone separator at 750° F. Of the 760 pounds water in the slurry, 420 pounds are separated as steam. Some of the volatiles are contained in this skimmed steam. The remainder of the steam is fed with the lignite into a flow type gasifier into admixture with 3610 s.c.f. of substantially pure oxygen at 60° F. The gasifier operates at 205 p.s.i.g. and approximately 2050° F. Gas of the following approximate analysis is obtained (dry basis):

| | Mol percent |
|---|---|
| Hydrogen | 39 |
| Carbon monoxide | 36 |
| Carbon dioxide | 23 |
| Nitrogen | 1 |
| Methane | 1 |

The solid residue is quenched with water, pulverized, and pulped with sulfuric acid in the presence of manganese dioxide. Acidity is adjust to a pH in the range of 1.0 to 1.5. The solids are separated from the solution by filtration and the solution contacted with a strong-base quarternary ammonium ion-exchange resin which removes substantially all of the uranium sulfate complex ions. The resin is eluted with sulfuric acid and sodium chloride (although nitric acid and ammonium nitrate may be used) and the uranium precipitated with ammonia. The precipitate is recovered by filtration, dried and calcined to produce a uranium oxide concentrate.

Obviously, many modifications and variations of the invention, as hereinbefore set forth, may be made without departing from the spirit and scope thereof, and therefore only such limitations should be imposed as are indicated in the appended claims.

I claim:

1. A process for the simultaneous production of carbon monoxide and recovery of uranium from a lignite containing uranium which comprises subjecting said lignite to reaction with oxygen at a temperature above about 2000° F. in relative proportions such that carbon contained therein is converted to carbon monoxide, separating residual non-combustible solid from resulting gaseous products of reaction, and extracting the residual solid with an aqueous solution of a reagent capable of forming a water soluble salt of uranium.

2. A process according to claim 1 wherein said residual solid is pulped with said reagent and uranium is recovered from said solution by extraction with an ion-exchange resin.

3. A process according to claim 1 in which said residual solid is subjected to extraction with an aqueous solution comprising sodium carbonate.

4. A process according to claim 1 wherein an auxiliary carbonaceous fuel is subjected to reaction with oxygen together with said uranium-containing lignite.

5. A process according to claim 1 wherein said residual solid is subjected to extraction with an aqueous solution of sulfuric acid.

6. A process according to claim 5 wherein said extraction is carried out in the presence of manganese dioxide.

7. A process for the simultaneous production of carbon monoxide and hydrogen and recovery of uranium from lignite containing uranium which comprises: dispersing powdered lignite in steam, discharging resulting dispersion into a reaction zone into admixture with free oxygen in an amount such that the carbon contained in said lignite is converted to carbon oxides comprising mainly carbon monoxide with the simultaneous production of hydrogen at an autogenously maintained temperature in the range of 2000° to 3200° F., separating incombustible residual solid from resulting gaseous products of reaction, extracting said residual solid with an aqueous solution of sodium carbonate containing sodium bicarbonate, and separating uranium-pregnant solution from the resulting solid residue.

8. A process for the simultaneous production of carbon monoxide and recovery of uranium from lignite containing uranium which comprises subjecting said lignite to reaction with free oxygen in an amount such that carbon contained in said lignite is converted to carbon oxides comprising mainly carbon monoxide with the simultaneous production of hydrogen at an autogenously maintained temperature in the range of 2,000° to 3,200° F., separating resulting gaseous products of reaction from non-combustible solid residue of enriched uranium content, quench cooling said solid residue from said reaction temperature by contact with an excess of liquid water effecting solution of a water-soluble fraction of said residue substantially free from uranium, and thereafter recovering uranium from undissolved solid residue from said water contacting step by leaching with an aqueous solution of a reagent capable of forming a water-soluble salt of uranium.

9. A process according to claim 8 in which said reagent is sulfuric acid.

10. A process according to claim 8 in which said reagent is sodium carbonate.

11. A process according to claim 9 in which an oxidizing agent is present in said leaching step.

12. A process according to claim 10 in which said leaching step is carried out at a pressure within the range of 50 to 600 pounds per square inch gauge and a temperature in the range of 225° to 300° F.

References Cited in the file of this patent

UNITED STATES PATENTS

| 2,597,504 | Larsson | May 20, 1952 |
| 2,780,514 | Lutz | Feb. 5, 1957 |
| 2,813,003 | Thunaes et al. | Nov. 12, 1957 |

OTHER REFERENCES

BMI-237, July 31, 1950 (Copy in Scientific Library).

AEC Document BMI-JDS-175, March 15, 1949 (date decl. Mar. 5, 1956), pages 14 and 15 (Copy in Scientific Library).

Kirk and Othmer: "Encyclopedia of Chemical Technology," vol. 8, pp. 765-772, 778-783 (1952) (Copy in Sci. Lib.).

Katz et al.: "Chemistry of Uranium" (1951), pp. 114, 115 (Copy in Scientific Library).

TID-3307, Dec. 1956, page 18 (Copy in Scientific Library).